US008566191B2

(12) United States Patent
Shelon et al.

(10) Patent No.: US 8,566,191 B2
(45) Date of Patent: Oct. 22, 2013

(54) GENERATING AN ANNUITY PAYMENT USING A DYNAMIC ASSET ALLOCATION INVESTMENT

(75) Inventors: Jonthan Shelon, Natick, MA (US); Ren Cheng, Sharon, MA (US)

(73) Assignee: FMR LLC, Boston, MA (US)

( * ) Notice: Subject to any disclaimer, the term of this patent is extended or adjusted under 35 U.S.C. 154(b) by 1854 days.

(21) Appl. No.: 11/174,944

(22) Filed: Jul. 5, 2005

(65) Prior Publication Data
US 2007/0011063 A1 Jan. 11, 2007

(51) Int. Cl.
*G06Q 40/00* (2012.01)
*G06Q 40/06* (2012.01)
*G06Q 40/08* (2012.01)
*G06Q 40/04* (2012.01)
*G06Q 40/02* (2012.01)

(52) U.S. Cl.
USPC .................. 705/35; 705/36 R; 705/4; 705/37; 705/38

(58) Field of Classification Search
CPC ....... G06Q 40/00; G06Q 40/06; G06Q 40/08; G06Q 40/04; G06Q 40/02
USPC ............................ 705/35, 36, 36 R, 4, 37, 38
See application file for complete search history.

(56) References Cited

U.S. PATENT DOCUMENTS

| | | | |
|---|---|---|---|
| 4,232,367 A | 11/1980 | Youden et al. | |
| 4,953,085 A * | 8/1990 | Atkins | 705/36 R |
| 5,752,236 A | 5/1998 | Sexton et al. | |
| 5,784,696 A | 7/1998 | Melnikoff | |
| 5,812,987 A * | 9/1998 | Luskin et al. | 705/36 R |
| 5,852,811 A * | 12/1998 | Atkins | 705/36 R |
| 5,864,828 A | 1/1999 | Atkins | |
| 5,884,285 A | 3/1999 | Atkins | |
| 5,911,135 A | 6/1999 | Atkins | |
| 5,999,917 A * | 12/1999 | Facciani et al. | 705/36 R |
| 6,052,673 A | 4/2000 | Leon et al. | |
| 6,055,517 A | 4/2000 | Friend et al. | |
| 6,064,986 A * | 5/2000 | Edelman | 705/36 R |
| 6,275,807 B1 * | 8/2001 | Schirripa | 705/36 R |
| 6,282,520 B1 | 8/2001 | Schirripa | |
| 6,336,102 B1 * | 1/2002 | Luskin et al. | 705/35 |
| 6,611,815 B1 * | 8/2003 | Lewis et al. | 705/36 R |
| 6,636,834 B1 * | 10/2003 | Schirripa | 705/36 R |
| 6,687,681 B1 | 2/2004 | Schulz et al. | |
| 6,799,167 B1 * | 9/2004 | Gullen et al. | 705/36 R |
| 7,016,870 B1 * | 3/2006 | Jones et al. | 705/35 |
| 7,080,032 B2 * | 7/2006 | Abbs et al. | 705/35 |
| 7,120,601 B2 * | 10/2006 | Chen et al. | 705/36 R |
| 7,249,077 B2 * | 7/2007 | Williams et al. | 705/35 |
| 7,313,543 B1 * | 12/2007 | Crane et al. | 705/39 |

(Continued)

OTHER PUBLICATIONS

Joe Nedzielski, Rebalancing Gains may be a Trade-Off of Risk, National Underwriter; Mar. 24, 1997, vol. 101, Issue 12, p. 7.*

(Continued)

*Primary Examiner* — Barbara Joan Amelunxen
(74) *Attorney, Agent, or Firm* — Proskauer Rose LLP

(57) ABSTRACT

An annuity is provided to an annuitant based on the performance of an investment. Assets of the investment are automatically reallocated over time and the annuity payment may change based on the performance of the automatically allocated assets. In some examples, the assets are automatically reallocated based on a demographic, which can include an age, a range of ages, and/or a gender.

27 Claims, 4 Drawing Sheets

(56) References Cited

U.S. PATENT DOCUMENTS

| | | | |
|---|---|---|---|
| 7,376,608 B1* | 5/2008 | Dellinger et al. | 705/36 R |
| 2001/0014873 A1* | 8/2001 | Henderson et al. | 705/35 |
| 2002/0038271 A1 | 3/2002 | Friend et al. | |
| 2002/0103733 A1 | 8/2002 | Barrington et al. | |
| 2002/0147670 A1* | 10/2002 | Lange | 705/35 |
| 2002/0147671 A1* | 10/2002 | Sloan et al. | 705/36 |
| 2002/0169701 A1 | 11/2002 | Tarbox et al. | |
| 2002/0174042 A1 | 11/2002 | Arena et al. | |
| 2002/0174045 A1 | 11/2002 | Arena et al. | |
| 2002/0188540 A1* | 12/2002 | Fay et al. | 705/36 |
| 2003/0233301 A1* | 12/2003 | Chen et al. | 705/36 |
| 2004/0054612 A1* | 3/2004 | Ocampo | 705/36 |
| 2004/0177021 A1* | 9/2004 | Carlson et al. | 705/36 |
| 2005/0080704 A1 | 4/2005 | Erlach et al. | |

OTHER PUBLICATIONS

Ref. U—Annonymous, Variable Annuities: What you Should know; U.S. Securities and Exchange Commission, Modified on Apr. 28, 2009. Website (http://www.sec.gov/investor/pubs/varannty.htm).*
•Joe Nedzielski, Rebalancing Gains may be a Trade-Off of Risk, National Underwriter; Mar. 24, 1997, vol. 101, Issue 12, p. 7.*

* cited by examiner

GENERATING AN ANNUITY PAYMENT USING A DYNAMIC ASSET ALLOCATION INVESTMENT

FIELD OF THE INVENTION

The description relates to generating an annuity payment using a dynamic asset allocation investment.

BACKGROUND

After retirement, individuals typically rely on savings and investments to pay for day-to-day expenses since they lack a steady job-related income. One method of saving and/or generating wealth is investing in an annuity. An annuity is a savings or investment contract that makes payments, immediately, or at some deferred time in the future, to the beneficiary (the "annuitant") of the contract, usually the individual that invested in the annuity, for the remainder of the individual's life. Some annuities allow the individual to save and/or grow money tax-deferred, taxing the gains at the time of disbursement. For post-retirement annuitants, deferring taxation is advantageous because the annuitant does not have an employment-derived income, typically falls into a lower tax bracket, and thus incurs a lower tax liability on the annuity payment. Two types of annuities are deferred annuities and immediate annuities. A deferred annuity begins making regular payments upon a certain date or event (e.g., upon the annuitant reaching age 65 or upon retirement). An immediate annuity begins making regular payments upon setting up the annuity or shortly thereafter (e.g., within a year). With an immediate annuity, the owner of the contract is, in a sense, buying an income stream. The money the contract owner buys the annuity with is pooled with the money of other contract owners, and their combined investments generate the money that will be used for annuity payments. Then at disbursement time, an annuitant is paid a certain amount as an annuity payment.

One aspect of determining annuity payments for an immediate annuity is the expected mortality of an annuitant. Mortality is an estimate of how long the individual will live based upon the individual's age, gender, and other factors. Because an annuity pays the annuitant for the rest of her life, the annuity provider determines the general amount of each annuity payment, how long annuity payments will likely be paid, and consequently the total amount paid to the annuitant over the course of the contract. For example, if a 76 year-old male has an estimated life expectancy of ten years, the amount per payment is calculated such that the initial purchase price of the annuity is sufficient to pay for annuity payments made over the course of those ten years.

Because annuity payments are made at regular intervals for the rest of the annuitant's life, if the annuitant lives past the estimated mortality date, and thus continues to receive annuity payments, the individual is getting more than the expected amount out of the annuity system; she is being paid more than she initially "invested" to buy into the income stream. Individuals that die before the estimated mortality date end up getting less out of the annuity system than expected and effectively pay for the payments of the individuals that lived past their expected mortality date.

Typically, money given to the annuity provider to purchase annuities is invested by the annuity provider to generate enough return that the annuity payments meet the income requirements of the annuitant's expected remaining lifespan as well as generate a surplus that goes to the annuity provider for administrative costs. The annuity provider guarantees certain annuity payments, so the annuity provider uses the purchase price of the annuity to invest in "safe" investments, such as money market funds and/or bonds, e.g., investments that are stable and predictable with respect to the rate of return.

In addition, or as an alternative to annuities, there is a product developed by FMR Corp., of Boston, Mass., that assists in saving for retirement. The product is a group of mutual funds called the Fidelity Freedom Funds® managed by Fidelity Investments. The Fidelity Freedom Funds® are mutual funds that have an asset allocation mix that includes domestic and international equity funds, investment-grade and high-yield fixed income funds, and short term investments like money market funds, Certificates of Deposit (CDs), or Treasury bills (T-bills).

The Fidelity Freedom Funds® are sometimes referred to as dynamic asset allocation funds because the asset allocation of the funds is changed over time by the fund managers. Geared towards saving for retirement, the Fidelity Freedom Funds® typically have an aggressive investment allocation when the investor is younger and seeks greater growth, and a more conservative allocation as the investor nears retirement, where the asset allocation shifts to a capital-preserving strategy. This is advantageous in that the Fidelity Freedom Funds® automatically change asset allocations based on the individual's stage of life as the individual approaches retirement. When the individual is younger, her portfolio is geared towards growth because the investor can tolerate more risk in the hopes of realizing a larger return. As the individual nears retirement, more and more of the money in her portfolio is moved to lower-risk, lower return investments and thus geared to principal retention. This typically ensures that the majority of the individual's money is available for retirement and is not as affected by contemporaneous swings in the stock market.

SUMMARY OF THE INVENTION

The description describes a dynamic asset allocation fund as an investment vehicle for an annuity, changing the asset allocation automatically over time such that an annuity payment amount is maintained. In one aspect, there is a method that includes providing an annuity payment to an annuitant based on a performance of an investment, and automatically reallocating assets of the investment over time. In another aspect, there is a method that includes determining a first asset allocation of an investment for a first time period based on a demographic and determining a second asset allocation of the investment, different from the first asset allocation, for a second time period based on the demographic. The method also includes determining an annuity payment amount made to an annuitant for a predefined period based on the performance of the investment. This is advantageous in that, in some implementations, as the annuitant approaches mortality her investment strategy automatically switches from income generation to income preservation through the use of a dynamic asset allocation investment.

In some implementations, the assets are automatically reallocated based on a demographic. The demographic can be that of a contract holder, the annuitant, or a hypothetical investor on whom the asset allocation is based. The contract holder is the one who contracts with an annuity provider to purchase an annuity and may be different from the annuitant. In some implementations, the demographic may be, but is not limited to, an age, a range of ages, or a gender. The assets may also be automatically reallocated based on a first parameter. One example first parameter is a benchmark rate. In some implementations the assets are automatically reallocated based on a life expectancy. In some of those implementations, the assets are automatically allocated such that payments last during the life expectancy. Assets may also be automatically allocated based on a second parameter. Some second parameters include, but are not limited to, a compound risk, a cash flow out of the investment, a start date, or any combination thereof. In some implementations, the assets are allocated by asset type. Asset types can include domestic and international equity funds, investment-grade and high-yield fixed income funds, and short term investments like money market funds, Certificates of Deposit (CDs), or Treasury bills (T-bills). Other investment vehicles may be alternative asset types such as real estate and private investments, or more traditional asset types such as mutual funds, commingled pools, and/or separate accounts. In some embodiments, an asset type in the plurality of asset types with the largest percentage of assets over a period of time during existence of the investment includes domestic equities. In some embodiments, over a period of time during existence of the investment, the investment includes one or more high risk asset types, such as international equities and high yield bonds.

In some implementations, the annuity payment is made at an interval. Additionally or alternatively, in some implementations, the annuity payment is guaranteed to the annuitant for life, and in at least one implementation, the annuitant is not the contract holder. The annuity may also optionally have a guarantee period or a withdrawal period.

In some implementations, the annuity payment can be calculated based on a previous annuity payment. Additionally or alternatively, the annuity payment can be calculated using a factor that relates performance of the investment to a benchmark rate. Additionally or alternatively, the annuity payment can be calculated using a factor that accounts for an administrative fee.

In some implementations, the investment includes a Fidelity Freedom Fund®, modified for an immediate annuity. The modified Fidelity Freedom Fund® employs a benchmark rate. The investment may also be selected from a plurality of funds, where each fund in the plurality of funds is based on age, gender, life expectancy, or any combination thereof. The plurality of funds may be selected from based on a risk tolerance.

In another aspect, there is a method that includes determining a first asset allocation for a first time period based on a benchmark rate, determining a second asset allocation for a second time period based on the benchmark rate, and determining an annuity payment amount made to an annuitant for a predefined period based on the benchmark rate. The annuitant has a life expectancy based on a demographic. In some implementations, the second asset allocation is different than the first asset allocation. The second asset allocation may be different because the annuitant has changed the demographic. For example, where the demographic is age, the annuitant may have aged. The demographic may also be a gender. This method is advantageous because it allows the asset allocation to be re-evaluated periodically and adjustments made based on market conditions.

In some implementations, the annuity payment amount is decreased if the second asset allocation does not perform at the benchmark rate. Alternatively, the annuity payment amount may be increased if the second asset allocation performs above the benchmark rate. For implementations with a predefined period, the predefined period is a guarantee period. The predefined period includes a lifetime of an annuitant. In some implementations, a payment is made to a beneficiary of an annuitant if an annuitant's lifetime is less than the guarantee period.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

Figure 1:
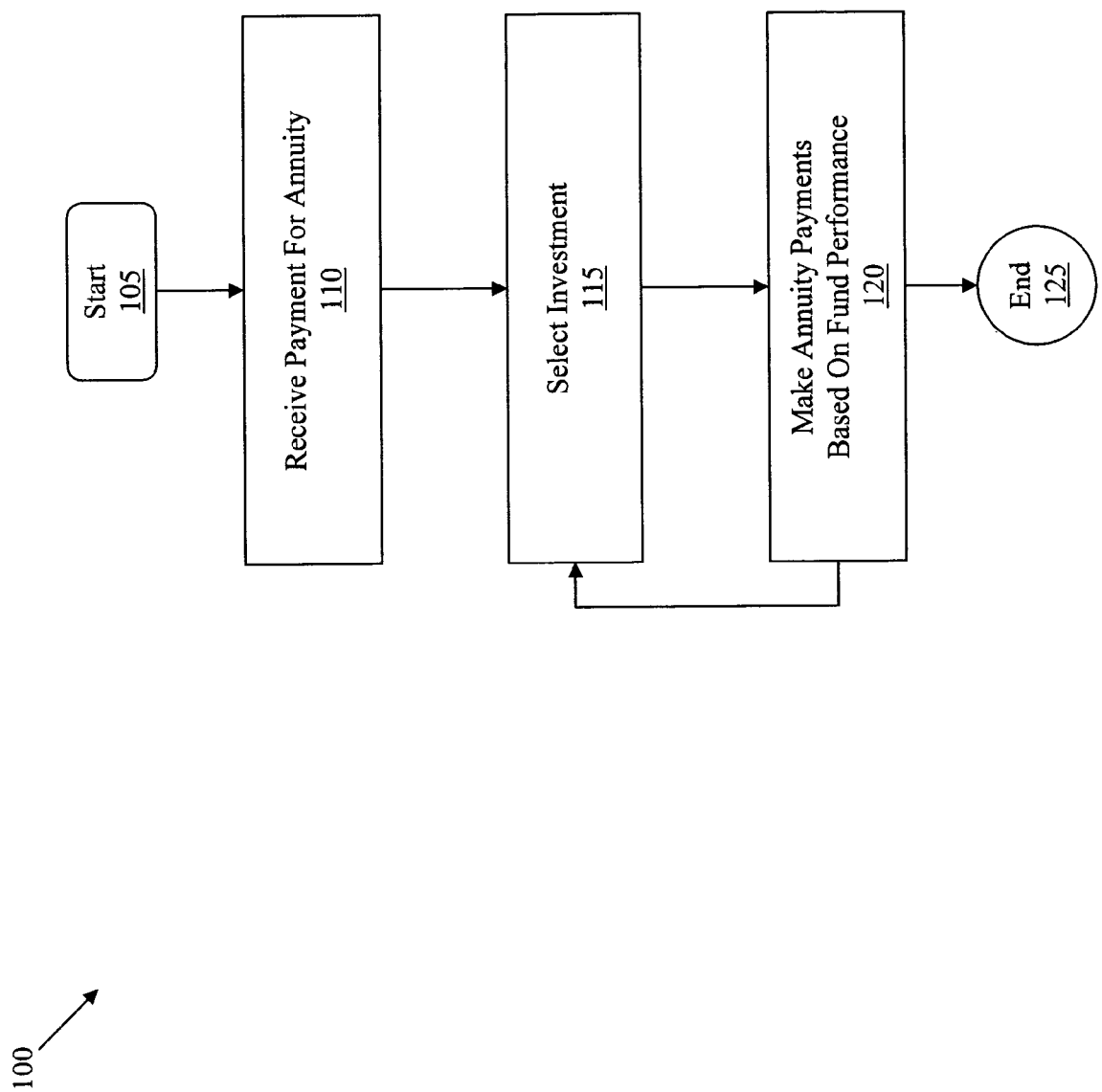
FIG. 1 is a flowchart that depicts the creation and lifecycle of an immediate annuity.

FIG. 1 is a process 100 that depicts the creation and lifecycle of an immediate annuity. The process 100 begins (105) by the annuity provider receiving (110) payment for the annuity. The payment is typically a lump sum amount that the contract holder pays to an annuity provider (e.g., an insurance company) in exchange for the annuity provider's promise to provide an annuitant (typically the same individual that bought the annuity, i.e., the contract holder) with an income stream of an estimated amount for the remainder of her life. Then the contract holder selects (115) an investment (e.g., a specialized fund) based on, for example, the annuitant's demographic information (e.g., age, gender, and/or other factors that can affect life expectancy). The contract holder is, in effect, buying an income stream that changes based on the performance of an investment, for the rest of the annuitant's life. Advantageously, such choice enables the income stream to increase over time based on an investment strategy that accepts more risk, and ideally, more reward, than a "safer," lower risk investment, such as government bonds, that typically have a lower rate of return over time.

The investment starts with an initial asset allocation, where the assets are divided among a variety of asset types. Beneficially, the investment's assets are dynamically reallocated (e.g., changing % of certain asset types) over time to cause the income stream to be maintained or even increased. Annuity payments are made (120) to the annuitant until the end of her life. The estimated amount of the initial payment determined by the annuity provider when the annuitant pays (110) for the annuity is based on a rate at which the annuity provider believes the fund will perform, sometimes referred to as the benchmark rate. This benchmark rate can be the predetermined rate used to determine the asset reallocation. The actual payments are based on the actual performance of the investment, and can vary over time. While the annuitant is alive, the annuitant can change (115) the selected investment by selecting a different investment on which to base the annuity payment. Any subsequent payment made (120) to the annuitant is then based on that new selection. In some examples, the annuitant is limited in the number of times she can make a new selection (e.g., once every quarter). Once the annuitant dies, the process ends (125). If the annuity is based on a guaranteed time period and the annuitant dies before that time period is complete, then annuity payments are made (120) to a designated beneficiary and the process ends (125) when the guaranteed period ends.

In process 100, the asset allocation that generates the annuity payment (e.g., selected in 115) is dynamically allocated over time so that payment can be made (125) to the annuitant. Because the annuity provider makes payments for the annuitant's lifetime, the asset allocation is based on an expected mortality table, being more aggressive initially with investment strategies when the annuitant has a longer life expectancy. The assets are also dynamically reallocated over time as the annuitant ages.

Figure 2:
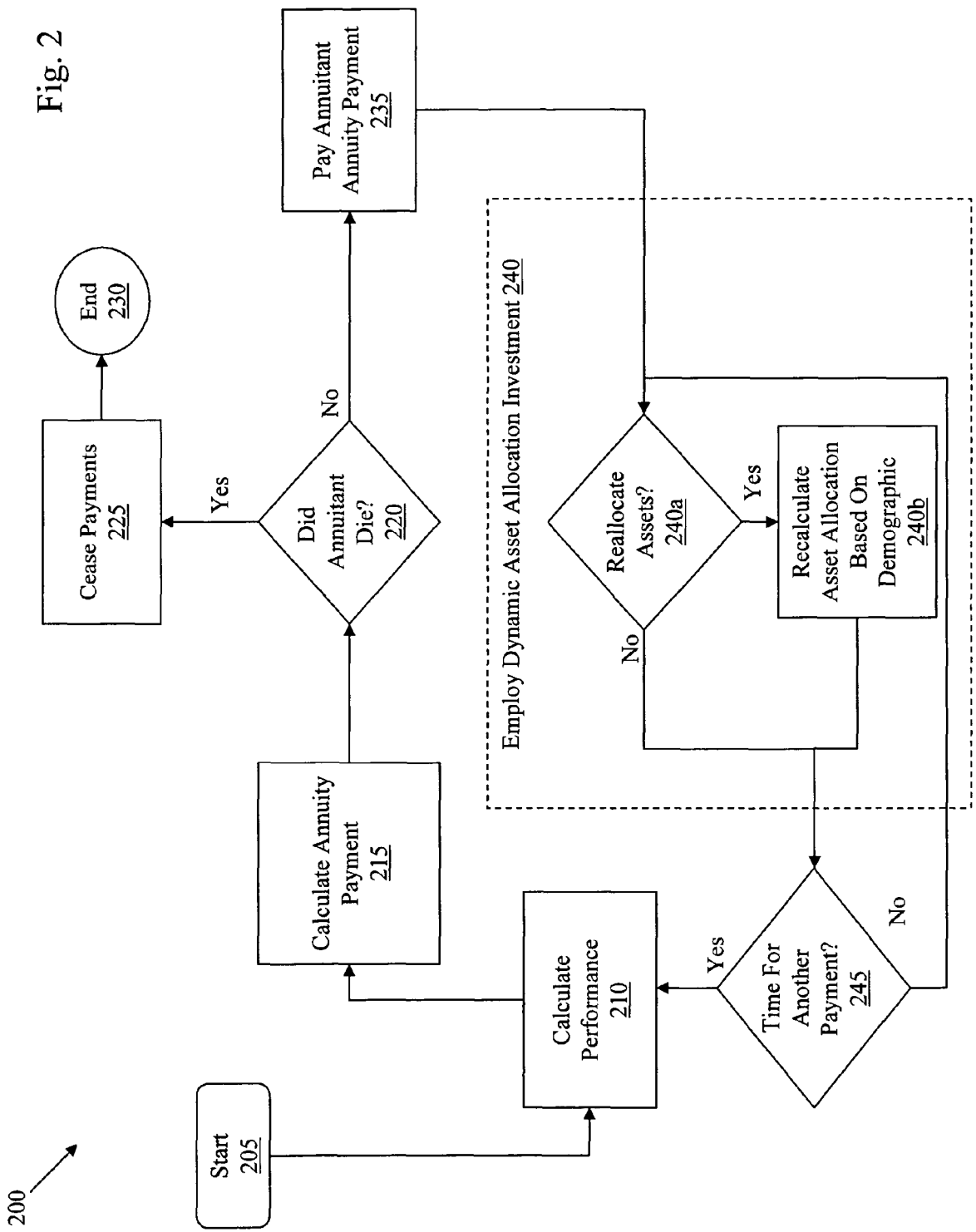
FIG. 2 is a flowchart that depicts the lifecycle of an annuity that uses dynamic asset allocation to perform at a benchmark rate.

FIG. 2 is a flowchart 200 that depicts the lifecycle of an immediate annuity that uses dynamic asset allocation that automatically reallocates assets of an investment over time, with the goal of performing at or exceeding a benchmark rate. The flowchart 200 begins (205) after the initial purchase of the annuity by the contract holder (e.g., 110 of FIG. 1). With the initial purchase (e.g., 110) and the initial selection (e.g., 115) by the purchaser, the annuity provider can invest part or the entire purchase price in an investment on which the annuity payments is based. Although this is not required (the annuity provider is only obligated to make lifetime payments to the annuitant based on performance of a selected investment and can invest the payment in anything the provider so chooses), the annuity provider may invest in the selected fund so that the annuity provider can maintain the reserves required by law and simply pass the investment risk through to the annuitant. For example, the annuity provider can buy Annuity Income Units which represent shares in a dynamic asset allocation mutual fund such as one of the Fidelity Freedom Funds® from Fidelity. The number of Annuity Income Units associated with an individual can determine the monetary amount of the annuity payments that the annuitant receives. The number of Annuity Income Units can be based on several factors such as the annuitant's age and gender, if the annuity income is guaranteed or not, the frequency of the annuity payment, the first payment date if not immediate, and the value of the shares of the fund on the date the annuity is created.

After the initial purchase, the annuity provider calculates (210) the performance (e.g., gains or losses) of the investment. An annuity payment is calculated (215) based on the performance of the selected investment. For example, if the investments experienced a gain, a portion of the gain is added (215) to the annuity payment (if the investment experienced a loss, a portion of the loss is subtracted (215) from the annuity payment). For example, annuity payments based on the performance of an investment can be determined using the equation:

$$\text{previous annuity payment} \times \left[ \frac{\text{performance of investment}}{\text{benchmark performance}} \right] \times (1 - \text{fee \%}) = \text{new annuity payment}$$

where if the difference between the performance of the fund and the benchmark rate is greater than an amount covering the fee, the annuity payment is increased. For example, if the previous annuity payment is $1,500, the investment returns an 8.5% gain, the benchmark rate is 3.5%, and the fee collected by the annuity provider to cover administrative costs is 1%, the new annuity payment increases to approximately $1,557 (1,500*(1.085/1.035)*(1−0.01)). It is worth noting that in the formula above, performance of investment and benchmark performance can be suitably replaced by performance factor and benchmark factor. The factor adds 1 to the performance figure in the formula.

This equation shows the benefit of allowing an annuity payment to be based on the performance of, for example, a mixed asset fund with equities and high risk investments, that historically have higher returns over time than low risk money market funds and/or government bonds. Such a formula enables the calculation to be performed on an automated basis, obtaining the variables from data input by a user or received from other calculations and/or computing devices (e.g., servers). Examples using this equation start with an initial payment (e.g., there is no "previous annuity payment" that has been calculated) that is determined by the annuity provider. The annuity provider determines an initial payment based on the purchase price and a payment stream based on a benchmark rate. For example, the determination can be made by calculating what a payment stream would be (e.g., equal periodic payments) in a hypothetical situation where the initial purchase price is invested in an investment that performs at the benchmark rate (e.g. the rate of return over time meets the benchmark rate) for the life expectancy of the annuitant, taking into account deductions for administration fees, profits, cost of money over time, inflation, etc. In the alternative, an initial payment can be calculated using the same equation (s) that are known in the art by annuity providers to calculate annuity payments that are not based on dynamic asset allocation investments. Once a known technique is used to calculate an initial payment, then the exemplary equation above can be used to calculate all subsequent payments.

Continuing with the process 200, the annuity provider determines (220) if the annuitant died. In some implementations, the annuity provider determines (220) that the annuitant has died if the annuity provider has or obtains information that the annuitant has died, e.g., receives notification from a family member accompanied by a death certificate or searches for the annuitant in one or more obituaries. This determination can be automated by having a computing device search for the name of the annuitant in obituary databases. If the annuity provider determines (220) that the annuitant has died, payments to the annuitant are ceased (225) and the annuity ends (230). If the annuity provider determines (220) that the annuitant has not died, e.g., assumes after a period of time without receiving or obtaining information that the annuitant has died, the annuity provider pays (235) the annuitant the calculated (e.g., 215) annuity payment.

A dynamic asset allocation investment is employed (240) to determine annuity payments. Gains and losses are calculated (e.g., 210) based on the performance of the investments' assets, which can be represented by an asset allocation into various asset types. The annuity provider, or the manager of the investment fund if the fund is managed by a party other than the annuity provider, determines (240a) if assets need to be reallocated, for example based on the annuitant's demographic and/or the benchmark rate. This determination can be an automated process using a computing device that uses, for example, the current date to determine if a certain time period has passed. If the annuity provider or fund manager determines (240a) that the assets need to be reallocated, the assets are reallocated (240b), with the goal to perform at or exceed the benchmark rate (plus the fee that goes to the annuity provider for administrative costs). This reallocation can be an automated process using a computing device that matches the assets in an investment to a predetermined asset allocation over time (e.g., the asset allocation shown in FIG. 3).

The annuity provider determines (245) whether it is time for another annuity payment. For example, the annuity payments are typically periodic (e.g., monthly, quarterly, annually), so that at the end of a period associated with a customer, the annuity provider determines (245) that it is time for another payment. This determination can be an automated process using a computing device that uses, for example, the current date to determine if a certain time period has passed. When it is time for another payment, the process 200 repeats elements 210-255 as described above.

To determine (240a) if assets need to be allocated, several factors are considered. One factor considered when dynamically allocating assets is a desired rate of return, e.g., a benchmark rate. The benchmark is a performance goal such that the gains from the invested assets will grow at a rate to maintain the annuity payment. For example, if the benchmark rate is 3.5%, the estimated annuity payments are based on the initial investment performing at 3.5%.

Investments performing at the benchmark rate allow the annuity provider to maintain identical annuity payments from one payment period to the next. If the annuitant lives exactly for her expected lifespan, the contract holder and the annuity provider break even. For example, in a general overview, the contract holder buys the annuity e.g., for $25,000, and the annuity provider pays the equivalent amount (e.g., $25,000, taking into account time) to the annuitant over the course of the annuitant's life. Typically, the annuity provider also accounts for administration fees, profits, etc. when determining an initial payment and a payment stream based on a benchmark rate. One reason for purchasing an annuity in that case is just in case the annuitant lives longer than the life expectancy, then the annuitant will have an income stream greater than the original payment would have allowed. However, the annuity provider offers a more attractive annuity product by allowing the annuitant to have the money invested in an investment of diverse asset types, instead of a single low risk, but low yield asset type (e.g., U.S. bonds). Allowing an annuity payment based on performance of a fund with several different asset types allows a possible payment at a much higher rate than the low risk, low yield investment vehicles. In some scenarios, the performance of the investments with respect to the benchmark rate affects the amount of the annuity payments. If the investment performs above the benchmark rate, the annuity payment is increased with respect to the original amount. If the investment performs worse than the benchmark rate, the annuity payment is reduced. In these cases, the annuity provider is not being exposed to much risk because if the purchase price (or a portion thereof) is invested in the basis investment (e.g., the investment on which the annuity payment is based) selected by the annuitant, then the annuity provider is passing the risk of the investment performance to the annuitant.

In some implementations, the investment is a modified Fidelity Freedom Fund®. Some exemplary Fidelity Freedom Funds® are the Lifetime Income I, Lifetime Income II, and Lifetime Income III funds, which have increasingly (with respect to the order listed) larger percentages of their asset allocations invested in equity mutual funds. The asset allocation (e.g., the percentage of assets in a certain asset type) of a modified Fidelity Freedom Funds®-based investment is typically influenced by, in addition to the benchmark rate, three other parameters: compound risk, cash flow, and start date. The compound risk is the total amount of risk of the portfolio. Portfolios with a high number of stocks or international holdings are high-risk. Portfolios with a high number of government bonds and short-term investments like T-bills are low-risk because government bonds are not as affected by stock market shifts or the state of international markets. Cash flow is the amount of money the individual expects to be paid out in each payment interval of the annuity. Start date indicates the relation of the date the annuity is started versus when the annuity will need to start producing income ("Annuity Income Date"). For immediate annuities, the start date and the Annuity Income Date are the same date or are very close, with typically less than a year between the start date and the Annuity Income Date.

Annuities can be qualified contracts or non-qualified contracts. A qualified contract is an annuity that is initially funded by a contribution transferred from an Individual Retirement Account (IRA) or rolled over from a qualified plan such as a 401(a), a 401(k) plan, a 403(b) plan or a governmental 457(b) plan. A non-qualified contract may be initially funded by money from any source.

In some implementations, an annuity pays the annuitant at regular intervals over the course of the annuitant's life. Examples of the regular intervals the annuity payments are made are monthly, quarterly, semiannually, or annually. The annuity payments may be paid out for the life of a single annuitant or two annuitants if the annuity is set up as a joint annuity, whereby payments are made for the life of the longest surviving annuitant. In some implementations, the joint annuitants receive a higher annuity payment while both annuitants are alive and, in the event that one annuitant dies, the survivor receives a reduced payment.

Immediate annuities are a balance between using a large initial amount to purchase an income stream for the rest of the annuitant's life and taking a chance that the annuitant's death is far enough in the future to enjoy the full price of the purchase. If the annuitant dies early, her estate does not recoup the unpaid payments. If she exceeds her expected mortality, she gains more than she put in. In addition to the unpredictability of mortality, not all investments experience gains. Annuities based on assets that are reallocated over time to perform at the benchmark rate avoid losing value and can result in the income stream not being depleted before the annuitant's life ends. Additionally, some annuities have a guarantee period that provides the annuitant with a certain number of years of guaranteed payments. Typically annuity payments for annuities with a guarantee period are less than annuities without a guarantee period since the annuity provider is incurring a cost by guaranteeing the annuity provider will make annuity payments to the annuitant for a set number of years.

Additionally, some annuities have withdrawal periods in which the annuitant may withdraw principal from the annuity (e.g., a portion of the purchase price). If money is withdrawn in accordance with a withdrawal period, typically the future annuity payments will be diminished because of the decreased earning power of the annuity principal (e.g., the portion of the purchase price invested by the annuity provider). The withdrawal amount is typically a function of the valuation period. The amount available for withdrawal is based on two values which respectively represent a portion of the initial purchase price that provides annuity payments during the withdrawal period and the portion of the initial purchase price that provides annuity payments after the withdrawal period.

In some implementations, the initial purchase price paid by the customer for the annuity purchases Annuity Income Units. The Units are tied to a particular investment vehicle (e.g., a Freedom Fund®) and are assigned a value depending on the vehicle. The number of Annuity Income Units associated with an annuitant determines the annuity payment amount. On the date the annuity payment is to be made (the Annuity Income Date), the number of Annuity Income Units is multiplied by the value of the Annuity Income Unit for that particular investment vehicle. The result is the amount of the annuity payment for that annuity payment period, typically disbursed on the first business day after the Annuity Income Date. The value of an Annuity Income Unit is affected by the expenses of the investment vehicle, the expenses associated with a mortality and expense risk charge, and an administrative charge. The method of calculating the value of an Annuity Income Unit is as follows: the Net Investment Factor (measures the investment performance of the asset allocation) for the a particular valuation period is multiplied by the Annuity Income Unit value from the preceding valuation period, which is then multiplied by a daily benchmark rate factor. The daily benchmark rate may be, for example $1/(1.00+\text{benchmark rate})^{1/365}$, where $1/365$ represents the time interval. When the benchmark rate equals 3.5%, this resolves to 0.99990575. The Annuity Income Unit Value is then adjusted for the number of days in the valuation period.

Figure 3:
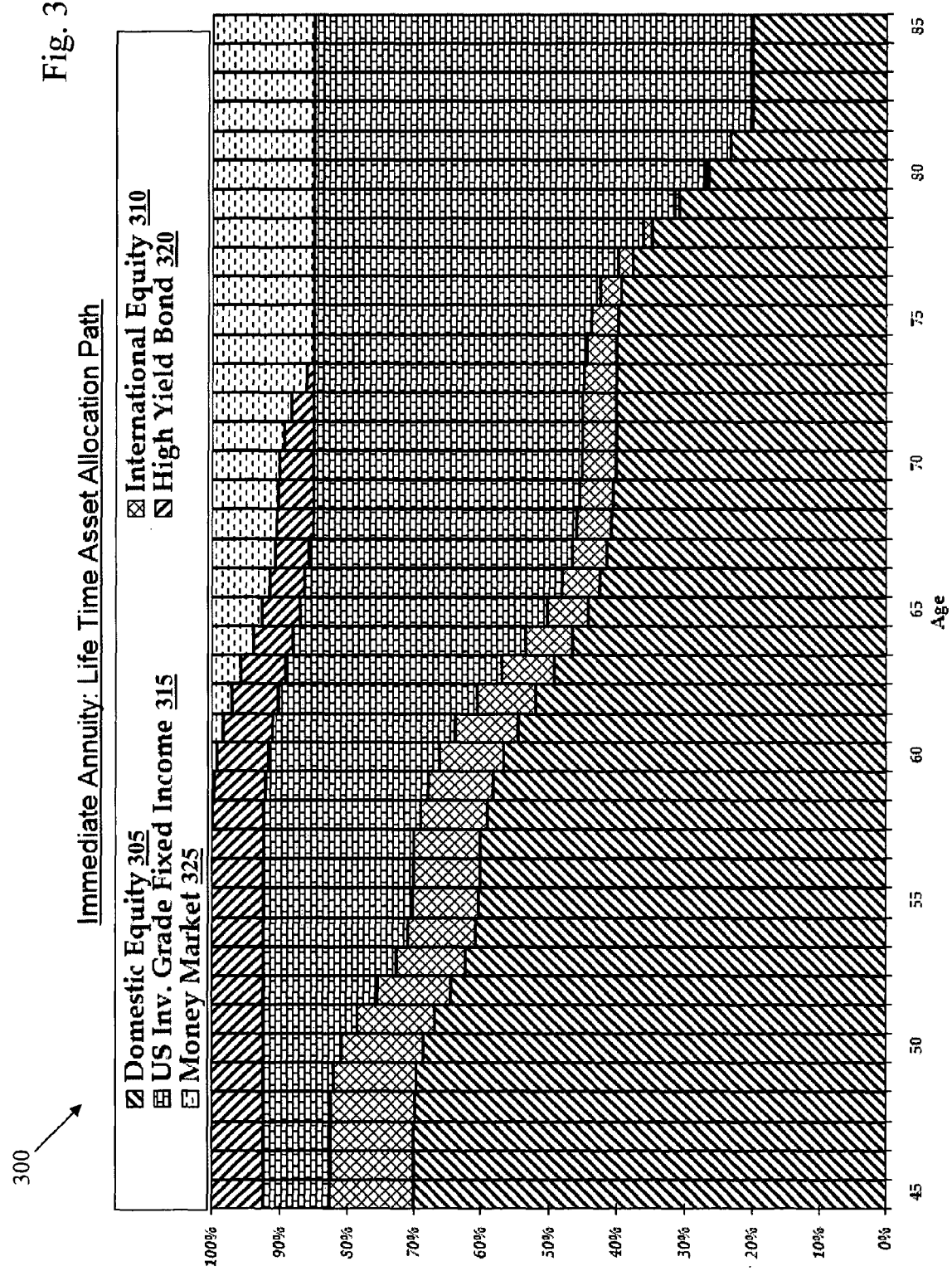
FIG. 3 depicts an exemplary dynamic asset allocation investment that is managed to perform at a benchmark rate.

FIG. 3 depicts an exemplary dynamic asset allocation investment 300 on which an annuity payment can be based. As depicted in FIG. 3, the asset allocation changes over time depending on the annuitant's age. For example, when the annuitant is 45 years old, her asset allocation would include approximately 70% domestic equity 305 (e.g., from the 0% allocation marker to the 70% marker), approximately 12% international equity 310 (e.g., from the 70% marker to the 82% marker (not shown)), 10% in U.S. Investment Grade Fixed Income 315 (e.g., from 82% to the 92% marker) and the remaining 8% being high yield bonds 320 (e.g., from the 92% marker (not shown) to the 100% marker). When the annuitant is 60 years old, the asset allocation is different. For a 60 year-old annuitant, approximately 57% of the assets are invested in domestic equity 305. Approximately 10% of is invested in international equity 310, and 25% in U.S. investment-grade fixed income 315. The remaining 8% is split between high yield bonds 320 (approximately 7%) and short term investments 325 such as Money Markets (approximately 1%). When the annuitant reaches 85 years old, the assets are dynamically allocated towards an income-preserving investment strategy. For example, only 21% of the assets are domestic equity 305. Approximately 63% are U.S. investment-grade fixed income 315, and the remaining 16% are Money Markets 325. This dynamic asset allocation, where assets are "rolled-down" from high-risk equity investments to lower-risk investments as the annuitant ages, allows the annuity provider to maintain annuity payments because the return rate on the investments is more stable later on when income preservation is more important than income generation.

It is worth noting that the asset allocation is automatically reallocated over time according to the predetermined allocation depicted in FIG. 3. The manager of this fund reallocates the assets into the different asset types over time, in this case each year. There in no needed intervention by the annuitant or the annuity provider to change the asset allocation. Because the asset allocation over time is predetermined, the process of reallocation can be automated and performed by computing devices that buy and sell assets of the predefined asset types using electronic trade systems.

Figure 4:
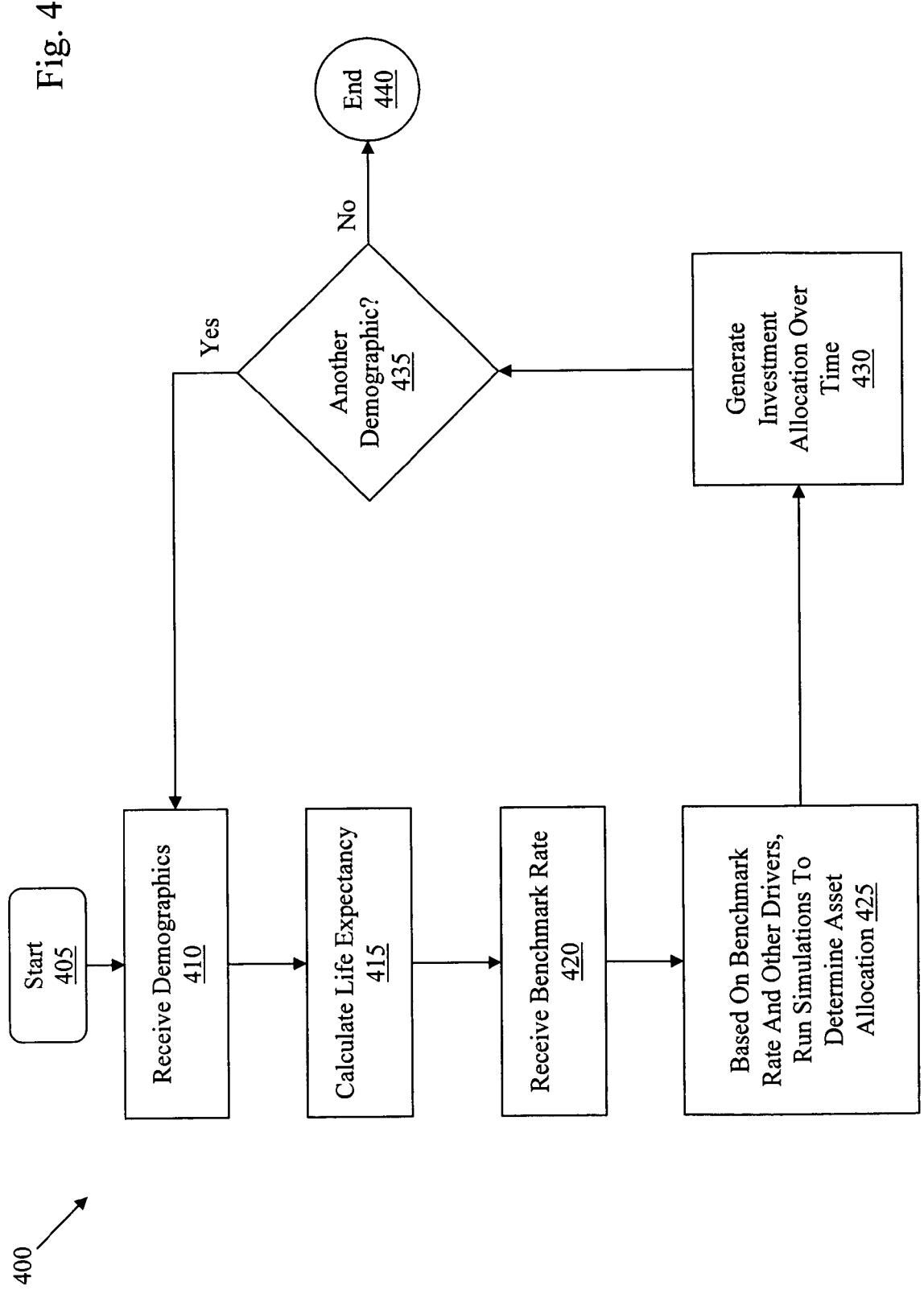
FIG. 4 is a flowchart depicting how assets are dynamically allocated over time.

FIG. 4 is a process 400 depicting how an investment is initially allocated and how assets are dynamically allocated/reallocated over time. The process starts (405) by the fund manager receiving (410) demographics about the annuitant. The demographic can include characteristics that influence life expectancy, such as age, gender, etc. The fund manager calculates (415) the annuitant's life expectancy (e.g., using standard mortality tables based on the demographic(s)). For example, the fund manager receives (410) a request for a fund for a 65 year-old male. The fund manager calculates (415) the life expectancy for a 65 year-old male. The life expectancy is used, for example, to determine how much risk an investor can tolerate. The longer the expected life, the more risk that can be tolerated. The fund manager receives (420) a target benchmark rate (e.g., from the annuity provider) that indicates a rate that will maintain annuity payments for the remainder of the annuitant's calculated (415) life expectancy. Based on the benchmark rate, the fund manager runs (425) simulations to find an asset allocation which will pay the benchmark rate over the calculated (425) life expectancy. One example of a simulation is a stochastic method of determining investment performance with a certain degree of confidence (e.g., Monte Carlo simulations). Analyzing the simulations, the fund manager generates (430) the asset allocations for the investment over time (e.g., from current age to the end of the life expectancy). For example, the result can look like the asset allocation illustrated in FIG. 3. In an example where the allocation ends at the end of the life expectancy, the asset allocation can simply remain unchanged for the rest of the time the investment remains in effect.

Using age as the exemplary demographic, the fund manager can set up funds for each age. More likely, demographics are grouped together, or the demographic is a range or group of demographics. For example, ages with a very close life expectancy can be grouped together. In other examples, one investment allocation over time is generated (430) for the demographic of annuitants ages 45-55, another investment allocation over time is generated (430) for the demographic of annuitants ages 56-65, another investment allocation over time is generated (430) for the demographic of annuitants ages 66-75, etc. In the process 400, the fund manager determines (435) whether there is another demographic for which an investment allocation over time should be generated. If not, the process 400 ends (440). If there are more investments, the fund manager repeats elements 410-430. Although the process 400 refers to the fund manager as performing the process, other parties may perform the process 400 (or portion thereof) instead of the fund manager. For example, if the fund is managed by the annuity provider, the annuity provider may perform the process 400.

Because the asset allocations are based on demographics and asset allocations typically are not created for all of the demographics, there are ranges of demographics (where each range can be considered a demographic) associated with a particular asset allocation over time. For example, there can be asset allocations for males ages 65, 70, 75, and 80. A 68 year-old does not have a specific asset allocation, so he can use the asset allocation for 65 year-old annuitants or the asset allocation for 70 year-old annuitants. In process 100, the annuitant selects (115) the asset allocation on which to base the annuity payment. When making the selection, the annuitant or the annuity provider can make the selection based on a risk tolerance.

For example, as described above, an investment associated with a greater life expectancy (e.g., the asset allocation for 65 year-old annuitants) has an asset allocation that is heavier in higher risk asset types (e.g. U.S. equities), than an asset allocation associated with an older age (e.g., the asset allocation for 70 year-old annuitants). In such a situation, the 68 year-old can choose the asset allocation for 65 year-old annuitants if he wants to take the higher risk to hopefully earn higher returns, and thus a bigger annuity payment. Alternatively, if the 68 year-old is risk averse, he can choose the asset allocation for 70 year-old annuitants that may not result in a larger annuity payment, but performs more predictably and whose overall rate of return over time will stay close to the benchmark rate, thus having less risk of adversely affecting the income.

As indicated in FIG. 1, the annuitant can also change the investment on which the annuity payment is based while receiving payments. Using the above example, if the 68 year-old initially chooses the investment associated with the 65 year-old demographic because he is more risk tolerant, he can change over to the investment associated with the 70 year-old demographic. In some examples, such switching may be limited to a predefined number of times (e.g., 4) that the annuitant can make a switch.

From the foregoing, it will be appreciated that the systems and methods provided depict an effective way to generate an annuity payment using a dynamic asset allocation find. The dynamic asset allocation can be achieved using a benchmark rate.

The above-described techniques and asset allocation determinations can be implemented in digital electronic circuitry, or in computer hardware, firmware, software, or in combinations of them. Implementations can be as a computer program products, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A computerized method for reallocating assets of a variable annuity without user input, comprising:
   determining, by a computing device, prior to the inception of the variable annuity, a dynamic asset allocation for the variable annuity, the dynamic asset allocation including at least two different asset allocations corresponding to at least two different time periods of a lifetime of the variable annuity, a first asset allocation corresponding to a first time period and a second asset allocation corresponding to a second time period;
   storing the dynamic asset allocation into computer memory;
   allocating, by the computing device, the assets of the variable annuity according to the first asset allocation corresponding to the first time period of the dynamic asset allocation;
   using, by the computing device, a predetermined algorithm to reallocate the assets of the variable annuity without obtaining any user input after the inception of the variable annuity, the assets of the variable annuity reallocated according to the second asset allocation corresponding to the second time period of the dynamic asset allocation; and
   determining, by the computing device, at least one annuity payment for an annuitant based on performance of the assets of the variable annuity.

2. The method of claim 1 wherein the dynamic asset allocation is based on a demographic.

3. The method of claim 2 wherein the demographic comprises an age.

4. The method of claim 2 wherein the demographic comprises a gender.

5. The method of claim 2 wherein the demographic comprises a range of ages.

6. The method of claim 1 further comprising calculating the at least one annuity payment based on a previous annuity payment.

7. The method of claim 1 further comprising calculating the annuity payment using a factor that relates performance of the variable annuity to a benchmark rate.

8. The method of claim 1 further comprising calculating the at least one annuity payment using a factor that accounts for an administrative fee.

9. The method of claim 1 wherein the dynamic asset allocation is based on a first parameter.

10. The method of claim 9 wherein the first parameter comprises a benchmark rate.

11. The method of claim 9 wherein dynamic asset allocation is based on a second parameter.

12. The method of claim 11 wherein the second parameter comprises a compound risk, a cash flow out of the variable annuity, a start date, or any combination thereof.

13. The method of claim 1 wherein the dynamic asset allocation is such that payments are estimated to last during a life expectancy.

14. The method of claim 1 wherein the annuity payment is guaranteed to the annuitant for life.

15. The method of claim 1 wherein the variable annuity comprises-a mutual fund modified for an immediate annuity, wherein the mutual fund has an asset allocation mix changing over time.

16. The method of claim 15 wherein the mutual fund employs a benchmark rate.

17. The method of claim 1 further comprising selecting the variable annuity from a plurality of funds.

18. The method of claim 17 wherein the selection of one or more funds from the plurality of funds is based on age, gender, life expectancy, or any combination thereof, of the annuitant, or a group of annuitants to which the annuitant is most closely related.

19. The method of claim 17 further comprising selecting one of the plurality based on a risk tolerance.

20. The method of claim 1 wherein the assets are allocated into a plurality of asset types.

21. The method of claim 20 wherein the plurality of asset types comprises at least two of the following asset types: domestic equity, international equity, investment-grade fixed income, high-yield bond, money market, Certificates of Deposit (CDs), Treasury bills (T-bills), real estate trust, private investment fund, or mutual funds.

22. The method of claim 20 wherein an asset type in the plurality of asset types with the largest percentage of assets over a period of time during existence of the variable annuity comprises domestic equities.

23. The method of claim 1 further comprising:
   determining, by the computing device, if the annuitant is still living; and
   stopping, by the computing device, annuity payments if the annuitant is not living.

24. The method of claim 1 wherein the dynamic asset allocation is based on a demographic and a benchmark rate, the benchmark rate representing a rate of return needed to maintain identical predetermined annuity payments over the life of the variable annuity.

25. The method of claim 1 wherein the variable annuity is a deferred annuity.

26. The method of claim 1 wherein the variable annuity is an immediate annuity.

27. A computer program product, tangibly embodied in a non-transitory machine-readable storage device, the computer program product including instructions being operable to cause data process apparatus to:
   determine, prior to the inception of a variable annuity, a dynamic asset allocation for the variable annuity, the dynamic asset allocation including at least two different asset allocations corresponding to at least two different time periods of a lifetime of the variable annuity, a first asset allocation corresponding to a first time period and a second asset allocation corresponding to a second time period;
   store into computer memory the dynamic asset allocation;
   allocating, by the computing device, the assets of the variable annuity according to the first asset allocation corresponding to the first time period of the dynamic asset allocation;
   use a predetermined algorithm to reallocate the assets of the variable annuity without obtaining any user input after the inception of the variable annuity, the assets of the variable annuity reallocated according to the second asset allocation corresponding to the second time period of the dynamic asset allocation; and
   determine at least one annuity payment for an annuitant based on performance of the assets of the variable annuity.

* * * * *

UNITED STATES PATENT AND TRADEMARK OFFICE
CERTIFICATE OF CORRECTION

| | | |
|---|---|---|
| PATENT NO. | : 8,566,191 B2 | Page 1 of 1 |
| APPLICATION NO. | : 11/174944 | |
| DATED | : October 22, 2013 | |
| INVENTOR(S) | : Jonathan Shelon et al. | |

It is certified that error appears in the above-identified patent and that said Letters Patent is hereby corrected as shown below:

On the title page, under Item (75) Inventors: replace "Jonthan Shelon" with --Jonathan Shelon--

Signed and Sealed this
Thirty-first Day of December, 2013

Margaret A. Focarino
*Commissioner for Patents of the United States Patent and Trademark Office*